United States Patent
Lubben et al.

(10) Patent No.: US 9,303,692 B2
(45) Date of Patent: Apr. 5, 2016

(54) LUBRICATION OF POWER TRANSFER COMPONENTS

(71) Applicant: Deere & Company, Moline, IL (US)

(72) Inventors: Jeff Lubben, Hudson, IA (US); Peter J. Murfey, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 211 days.

(21) Appl. No.: 14/053,504

(22) Filed: Oct. 14, 2013

(65) Prior Publication Data

US 2015/0104127 A1 Apr. 16, 2015

(51) Int. Cl.
*F16C 33/66* (2006.01)
*F16H 57/04* (2010.01)

(52) U.S. Cl.
CPC ......... *F16C 33/6681* (2013.01); *F16C 33/6659* (2013.01); *F16H 57/04* (2013.01); *F16H 57/043* (2013.01); *F16H 57/0426* (2013.01); *F16C 2361/61* (2013.01); *F16C 2361/65* (2013.01)

(58) Field of Classification Search
CPC ............ Y10T 74/19991; F16H 57/043; F16H 57/0426; F16H 57/0423; F16H 57/0421; F16C 33/6681
USPC ....................... 184/6, 6.12, 7.1, 11.1, 11.2, 51
See application file for complete search history.

(56) References Cited

U.S. PATENT DOCUMENTS

| | | | | |
|---|---|---|---|---|
| 3,746,128 | A * | 7/1973 | Wunsch | F02B 33/42 184/6.11 |
| 3,785,458 | A * | 1/1974 | Caldwell | B60R 17/00 184/11.1 |
| 4,347,759 | A * | 9/1982 | Renk | F16N 7/28 74/467 |
| 4,495,830 | A * | 1/1985 | Yasue | F16H 57/0423 74/467 |
| 4,541,510 | A * | 9/1985 | Itoh | F16H 63/18 184/6.12 |
| 4,987,974 | A * | 1/1991 | Crouch | F16H 57/043 184/11.1 |
| 5,154,517 | A * | 10/1992 | Hodge | F16C 33/4623 384/470 |
| 5,184,967 | A * | 2/1993 | Onoue | B63H 20/002 184/6.12 |
| 5,653,658 | A * | 8/1997 | Bouteille | F16H 57/0493 184/11.2 |
| 8,262,093 | B2 * | 9/2012 | Omagari | F16J 15/3252 277/551 |
| 2014/0150589 | A1 * | 6/2014 | Johannsen | F16H 57/0426 74/467 |

* cited by examiner

*Primary Examiner* — William A Rivera
*Assistant Examiner* — Michael Riegelman

(57) ABSTRACT

An apparatus for lubricating power transfer components is described. The apparatus includes a first shaft enclosed by a housing with a main cavity, and an inboard bearing and an outboard bearing supporting the first shaft. An inboard bearing cavity and an outboard bearing cavity surround, respectively, the inboard and outboard bearings. Lubrication fluid flows from an entrance port in the housing, through a flow passage within a wall of the housing to the inboard bearing cavity, through a flow passage within the first shaft from the inboard bearing cavity to the outboard bearing cavity, and through an overflow port in a wall of the outboard bearing cavity. A second shaft provides rotational power to the first shaft (e.g., via an idler gear). A lubrication deflector, such as a frustoconical deflector, surrounds a portion of a second shaft and extends into the main cavity of the housing.

19 Claims, 14 Drawing Sheets

LUBRICATION OF POWER TRANSFER COMPONENTS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to lubrication of various components, including power transfer components such as gears and bearings of an offset axle and offset gear box.

BACKGROUND OF THE DISCLOSURE

In various settings, it may be desirable to lubricate various power transfer (and other) components in order to facilitate smooth operation of related machinery and to generally protect the components against wear or other damage. In many applications, such lubrication is effected through the use of external flow lines. For example, in order to lubricate components of an offset gear box (e.g., for an off-set drive axle of a tracked work vehicle), lubrication fluid may be routed from a pump through one or more external flow lines (e.g., rubber hoses) to the gear box components. This may present various issues, including damage to the flow lines or disconnection of the flow lines due to impact or other interference from the environment.

Related issues may arise with respect to operation of a vehicle (or non-operation of a vehicle) when the vehicle is tilted away from its normal configuration (e.g., due to the vehicle driving or parking on sloped terrain). One such issue relates to unwanted flooding of certain lubrication sumps and unwanted drainage of other sumps. For example, if a vehicle is driving along sloped terrain in a direction perpendicular to the slope (e.g., driving across the face of a hill) oil may tend to pool in areas on the down-slope side of the vehicle and drain from areas on the up-slope side of the vehicle. This, along with other issues, may impede effective lubrication of vehicle components and even, in certain instances, prevent operation of the vehicle entirely, due to loss of lubrication fluid from crucial areas. This may be a particular problem, for example, for vehicles with offset axles (e.g., tracked vehicles), as offset axle housings and offset gear boxes may be designed to operate with a particular oil sump level, in order to appropriately lubricate various (offset) drive train components. Further, although additional oil may be provided to a lubrication system in order to somewhat mitigate these drainage/flooding effects, this additional oil may increase parasitic losses on a system (e.g., through increased windage losses due to various components rotating through the additional oil).

"Offset" as used herein may refer to a component that is located (or operates) out of a relevant axis or plane with respect to a reference component. For example, an offset axle may be offset from a reference drive shaft to the extent that the axle rotates about a parallel axis that is not co-axial with the axis of rotation of the drive shaft.

SUMMARY OF THE DISCLOSURE

A lubrication apparatus is disclosed for lubricating various power transfer components, including gears and bearings of an offset axle assembly.

According to one aspect of the disclosure, a lubrication apparatus includes a first shaft enclosed, at least in part, by a housing having a first cavity and rotatably supported by an inboard bearing within an inboard bearing cavity. The apparatus includes an outboard bearing rotatably supporting the first shaft within an outboard bearing cavity defined, at least in part, by a first internal flange of the housing. The apparatus includes an entrance port to the housing that is in fluid communication with a lubrication fluid flow source. A first flow passage, contained within a wall of the housing, and extends from the entrance port to the inboard bearing cavity. A second flow passage, contained within the first shaft, extends from the inboard bearing cavity to the outboard bearing cavity. An overflow port through the first internal flange of the housing extends between the outboard bearing cavity and the first cavity. The lubrication fluid from the lubrication fluid flow source flows into the entrance port and through the first flow passage, fills the inboard bearing cavity, flows through the second flow passage to the outboard bearing cavity, and drains from the outboard bearing cavity through the overflow port and into the first cavity.

One or more of the following features may also be included in the disclosed lubrication apparatus. The entrance port may be radially offset from the first shaft. The inboard bearing cavity may be sealed, at least in part, by a cover and one or more seals, the cover and the one or more seals being located inboard of the inboard bearing. The outboard bearing cavity may be sealed with one or more seals, which may be lubricated by the lubrication fluid in the outboard bearing cavity.

The lubrication apparatus may include a gear attached to the first shaft. The apparatus may include a thrust bearing separating the gear from a second internal flange of the housing, which defines, at least in part, the inboard bearing cavity. The apparatus may include a lubrication port in the second internal flange extending between the inboard bearing cavity and a face of the thrust bearing. The lubrication fluid may pass from the inboard bearing cavity through the lubrication port to lubricate the gear, the thrust bearing, or both. The lubrication port may provide an anti-rotating force to an extension of the thrust bearing.

The apparatus may include a second shaft extending into the first cavity of the housing through a third internal flange of the housing, which separates, at least in part, the first cavity from a second cavity. A gear attached to the first shaft may receive rotational power from the drive shaft. The second shaft may be radially offset from the first shaft. The apparatus may include a first cavity sump within the first cavity containing lubrication fluid.

The apparatus may also include a lubrication fluid deflector surrounding a portion of the drive shaft and extending, at least in part, from the third internal flange into the first cavity. The lubrication fluid deflector may include a frustoconical wall section having a primary axis, a first end, and a second end. The first end may have a larger radius than the second end. The second end of the wall section may be contained by the first cavity and may be located outward of the first end of the wall section. The wall section may include one or more openings extending along a portion of the wall section that permit passage of lubrication fluid through the frustoconical wall section. The one or more openings may extend inward along the wall section from the second end of the wall section toward the first end of the wall section.

According to another aspect of the disclosure, a lubrication apparatus includes a first shaft extending through a first internal flange of a housing and into a first cavity within the housing. The apparatus includes a cavity sump within the first cavity, containing lubrication fluid. The apparatus includes a lubrication fluid deflector surrounding, at least in part, the first shaft, and extending, at least in part, into the first cavity.

One or more of the following features may also be included. The fluid deflector may include a radial extension of the first shaft. The lubrication fluid deflector may extend from the first internal flange to a first radial distance away from the first shaft. At a point within the first cavity the lubrication deflector may extend to a second radial distance away from the first shaft. The first radial difference may be different from the second radial distance.

The fluid deflector may include a frustoconical wall section surrounding, at least in part, a portion of the first shaft and having a primary axis, a first end with a first radius, and a second end with a second radius, the first radius being larger than the second radius. The second end of the frustoconical wall section may be contained within the first cavity. The wall section may include one or more openings permitting passage of lubrication fluid through the wall section. The one or more openings may extend along the wall section from the second end of the wall section toward the first end of the wall section.

The apparatus may include a second shaft enclosed, at least in part, by the first cavity of the housing. The second shaft may be radially offset from the first shaft. The apparatus may include an inboard bearing rotatably supporting the second shaft within an inboard bearing cavity. The apparatus may include an outboard bearing rotatably supporting the second shaft within an outboard bearing cavity defined, at least in part, by a second internal flange of the housing. The apparatus may include an entrance port to the housing, the entrance port being in fluid communication with a lubrication fluid flow source. The apparatus may include a first flow passage contained within a wall of the housing and extending from the entrance port to the inboard bearing cavity. A second flow passage, contained within the second shaft, extends from the inboard bearing cavity to the outboard bearing cavity. An overflow port through the second internal flange of the housing extends between the outboard bearing cavity and the first cavity. Lubrication fluid from the lubrication fluid flow source may flow into the entrance port and through the first flow passage, fills the inboard bearing cavity, flows through the second flow passage to the outboard bearing cavity, and drains, at least in part, from the outboard bearing cavity through the overflow port and into the cavity sump. The entrance port may be vertically offset from the second shaft.

The apparatus may also include a gear attached to the second shaft that receives rotational power from the first shaft. The apparatus may include a thrust bearing separating the gear from a third internal flange of the housing that defines, at least in part, the inboard bearing cavity. The apparatus may include a lubrication port in the third internal flange that extends between the inboard bearing cavity and a face of the thrust bearing. Lubrication fluid may pass from the inboard bearing cavity through the lubrication port to lubricate one or more of the gear and the thrust bearing.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
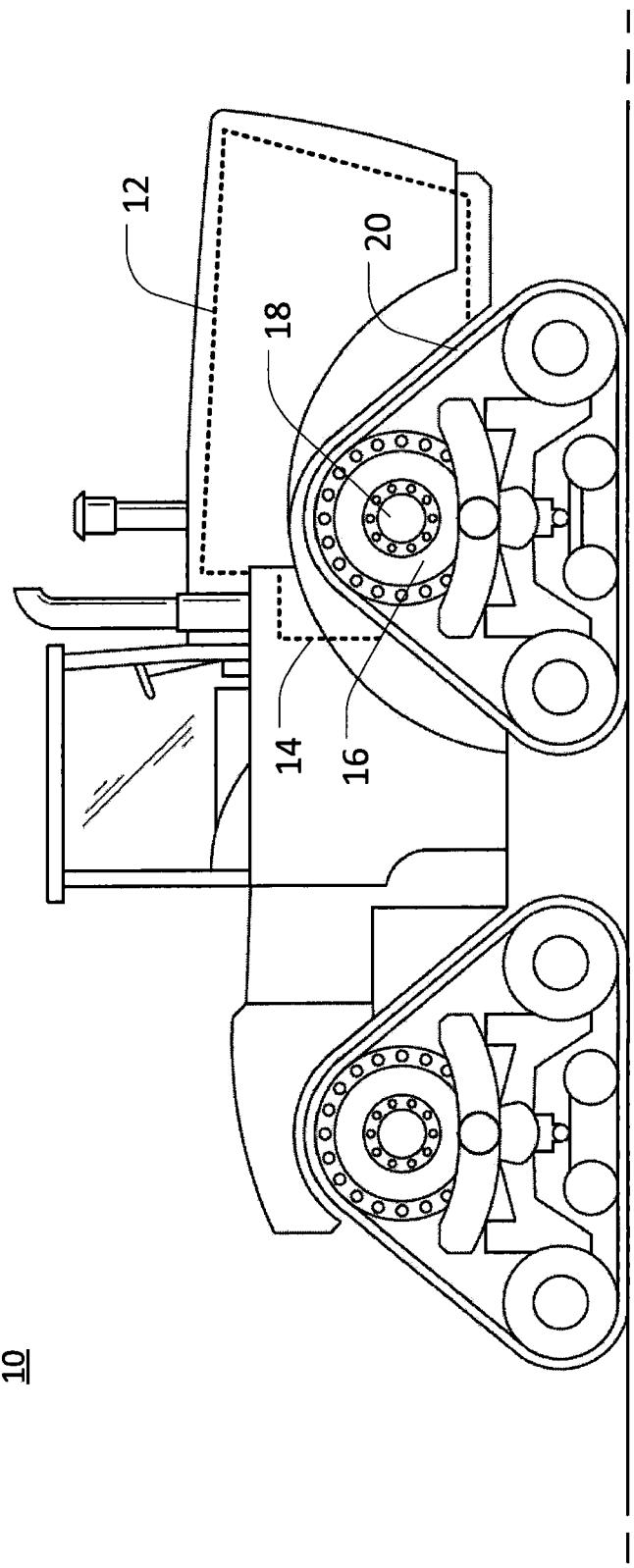
FIG. 1 is a side view of an example vehicle in which the disclosed lubrication apparatus for power transfer components may be implemented.

The following describes one or more example embodiments of the disclosed lubrication apparatus, as shown in the accompanying figures of the drawings described briefly above. Various modifications to the example embodiments may be contemplated by one of skill in the art.

As also noted above, it may be desirable to lubricate various power transfer components (e.g., of a vehicle) in order to ensure smooth operation of the components and generally protect the components from wear. External lines are sometimes utilized for this purpose, including in tracked work vehicles with offset axles and gear boxes. However, these lines may be dislodged, damaged, or otherwise adversely affected by operation of a vehicle in field conditions.

Additionally, although a vehicle may be configured with a particular normal orientation (e.g., fully upright), during actual operation the vehicle may sometimes operate (or pause in operation) while tilted away from normal. For example, if a vehicle drives across (or parks on) the face of a hill, the vehicle may be tilted away from normal, with one side (e.g., front, rear, left side or right side) of the vehicle lower than another. In such a case, lubrication fluid (e.g., transmission oil) may tend to flow into areas that are down-slope (e.g., lubrication sumps on the down-slope side of the vehicle) and away from areas that are up-slope (e.g., lubrication sumps on the up-slope side of the vehicle). This may negatively impact lubrication of various components, including through the draining of certain sumps to insufficient oil levels and the flooding of other sumps with excessive oil.

Accordingly, it may be useful to provide a lubrication apparatus to address these and other issues. According to the principles of this disclosure, such a lubrication apparatus may, for example, provide an internal flow path for lubrication fluid (e.g., oil), including for an offset axle or gear box. Similarly, such a lubrication apparatus may, for example, counter various effects of tilted vehicle operation. For example, a lubrication apparatus may assist in maintaining appropriate oil levels in both up-slope and down-slope sumps in a tilted vehicle.

In general, vehicle tilt may result from vehicle "roll" (i.e., rotation about the vehicle's longitudinal centerline), vehicle "pitch" (i.e., rotation about the vehicle's lateral centerline), or vehicle "yaw" (e.g., pivoting about a nominal vertical axis of the vehicle). An example of roll-induced tilt may occur as a vehicle drives across the face of a slope, whereby the vehicle may be rotated around its centerline and away from its normal orientation due to the slope raising one side of the vehicle above the other. An example of pitch-induced tilt may occur as a vehicle drives directly up a slope, whereby the vehicle may be rotated about its lateral centerline as it climbs. An example of yaw-induced tilt may occur when a vehicle drives directly straight up a slope and then turns to either side. This turning (i.e., yaw) may change the orientation of the vehicle with respect to the slope and thereby affect the vehicle's deviation from a normal orientation. It will be understood that a vehicle may undergo various combinations of roll, pitch, or yaw, which may result in various degrees of vehicle tilt.

In certain embodiments, a flow passage may be contained, at least in part, within a wall of a housing (e.g., an offset axle housing). Lubrication fluid may flow through this passage to various components (e.g., a first bearing of an off-set half-axle shaft) and thus lubricate the components. An additional flow passage may be contained, at least in part, within a shaft associated with the housing, thereby providing a flow path for lubrication fluid from one end of the shaft (e.g., near a first bearing) to another end of the shaft (e.g., near a second bearing). Lubrication fluid may thus flow, for example, through a passage within a housing wall, then through an associated axle, from a first bearing to a second bearing, before being drained back to an associated sump.

Likewise, in certain embodiments, a shaft (e.g., an offset drive shaft) may extend into the housing through a flange. A lubrication fluid deflector (e.g., a frustoconical deflector) may surround the shaft and extend, at least in part, from the flange into the housing. Such a deflector may, for example, mitigate various effects of tilted vehicle operation including the tendency of oil to pool in down-slope regions and drain away from up-slope regions.

As will become apparent from the discussion herein, the disclosed lubrication apparatus may be used advantageously in a variety of settings and with a variety of work machines. For example, referring now to FIG. 1, vehicle 10 is depicted as a four-track tractor with power source 12 (e.g., an internal combustion engine) and power train 14. Vehicle 10 may include four track drives, each having an offset drive wheel 16, rotating about offset axle 18 and providing motive power to track 20. Example embodiments below may be configured, in various ways, to operate with respect to power train 14 and offset axle 18 of vehicle 10. It will be understood, however, that other configurations may be possible. For example, in certain embodiments the disclosed lubrication apparatus may operate with respect to a front or rear offset axle, a vehicle without offset axles, a non-tracked (i.e., wheel driven) vehicle, various non-vehicle applications (e.g., fixed machinery), and so on.

Figure 2:
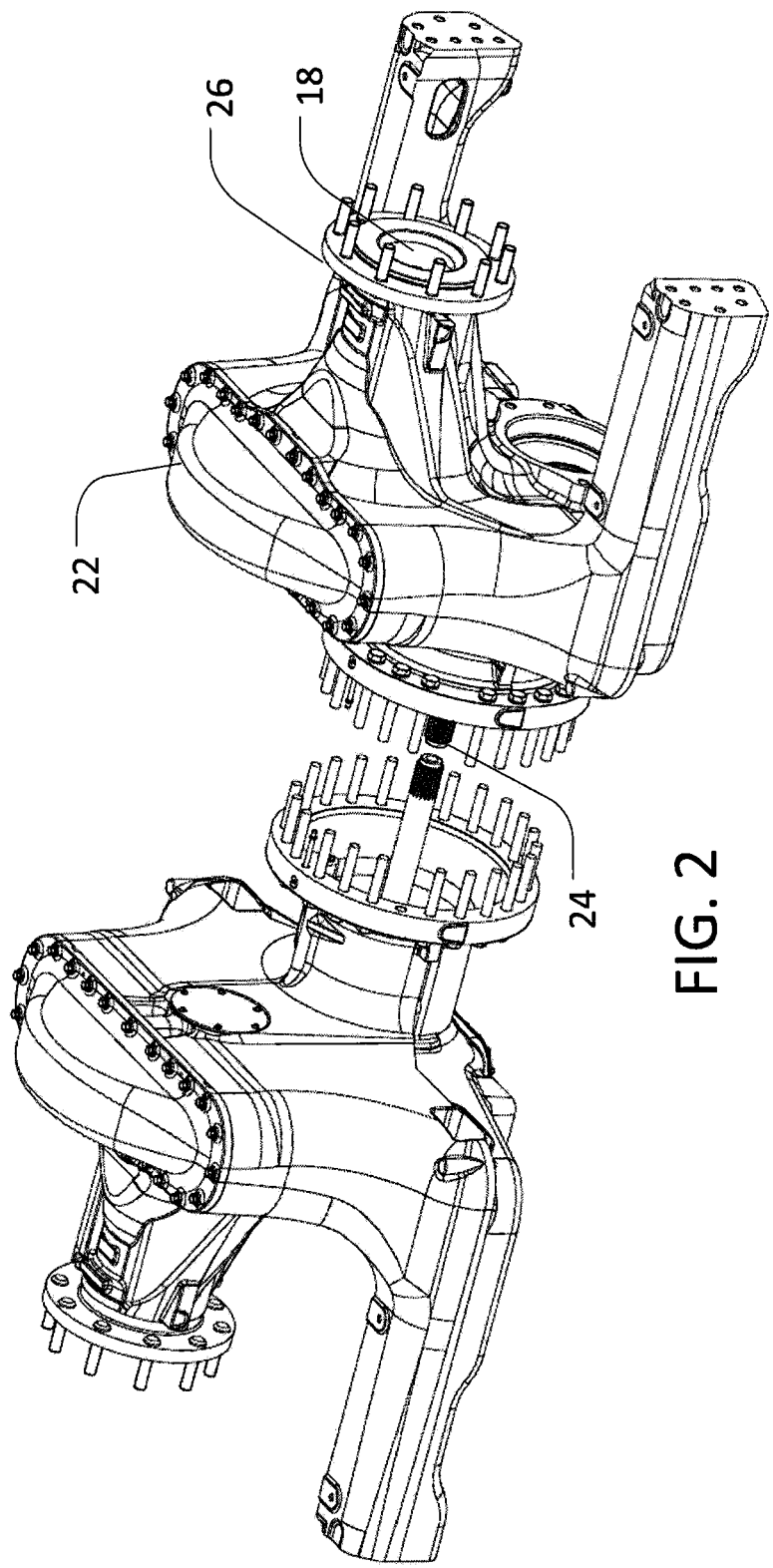
FIG. 2 is a perspective view of offset axle housings included in the vehicle of FIG. 1.

Referring also to FIG. 2, power train 14 may include housing 22. In certain embodiments, housing 22 may be an axle housing, such as one of two half-axle housings, each configured to receive power from power source 12 and transmit power to a half-axle shaft (e.g., axle 18). As depicted in FIG. 2, housing 22 may contain offset axle 18, which may be driven by an offset gear set (see FIG. 1) transmitting power from powered shaft 24. Offset drive wheel 16 (not shown in FIG. 2) may, for example, attach to hub 24 at the end of axle 18 so that rotational power from axle 18 (received from power source 12 via powered shaft 24) may be transmitted to track 20 to drive vehicle 10, shown in FIG. 1.

Figure 3:
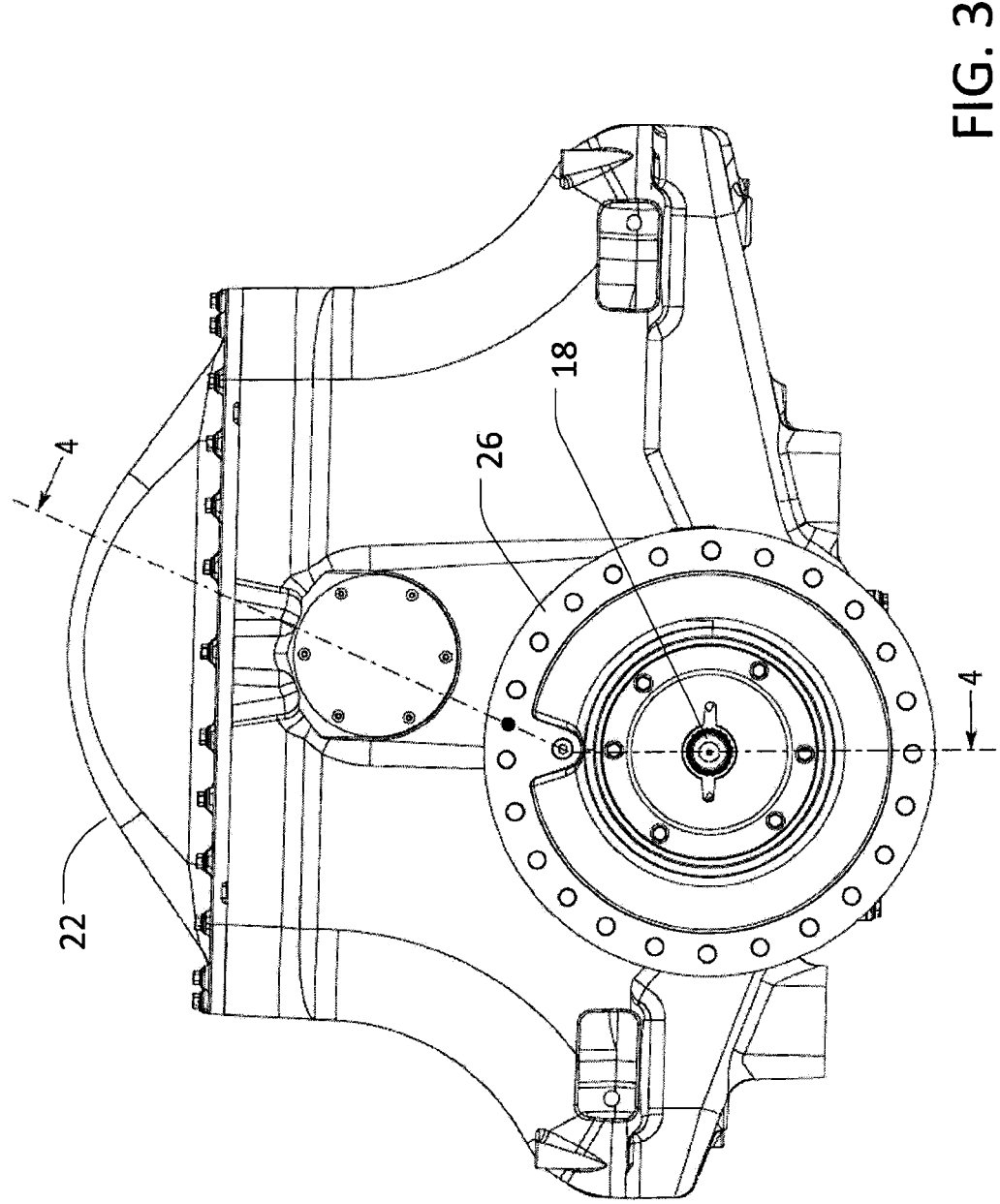
FIG. 3 is a side view of part of the offset axle housing of FIG. 2.
Figure 4:
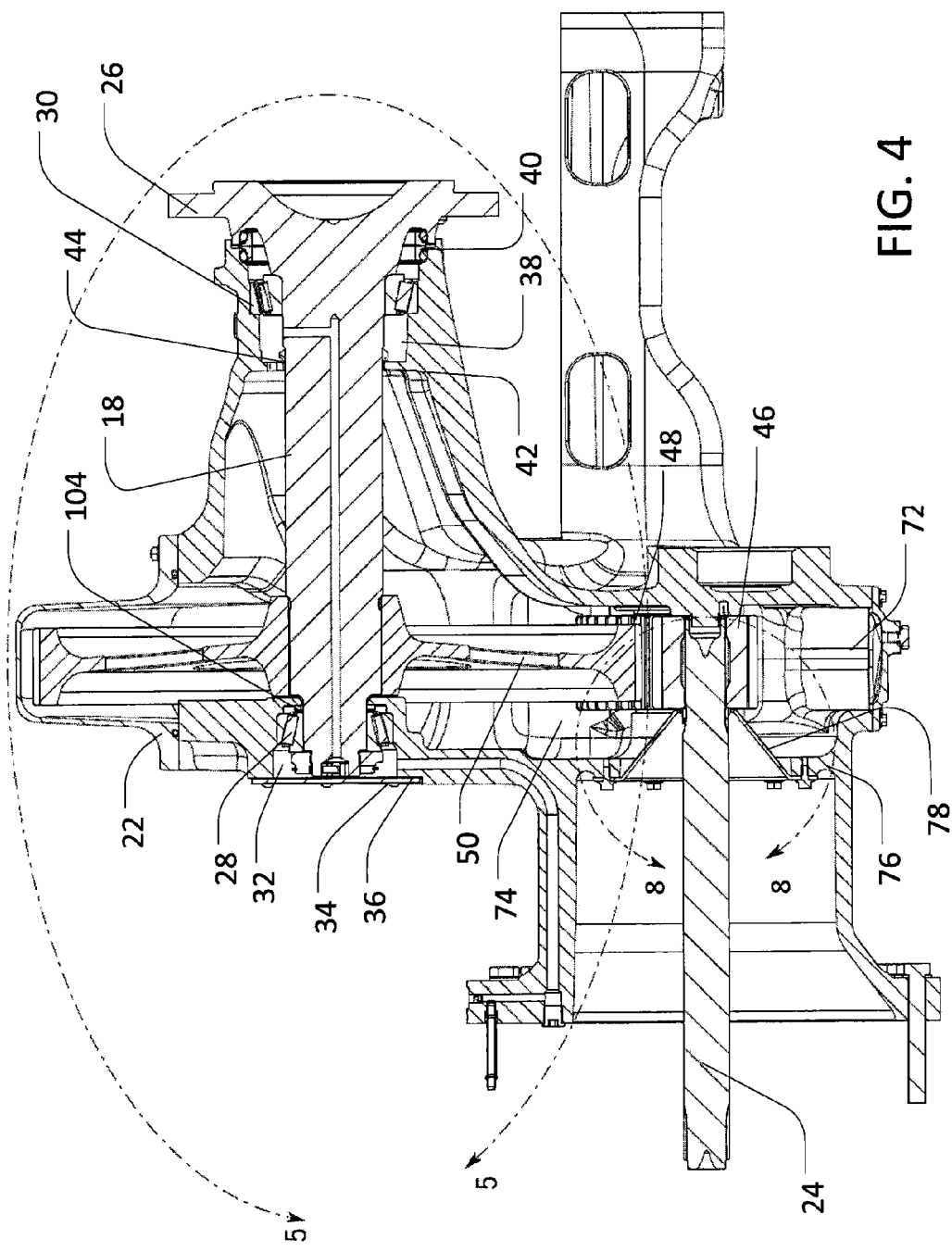
FIG. 4 is a sectional view taken along line 4-4 of FIG. 3 showing a lubrication apparatus included in the offset axle housing of FIGS. 2 and 3.

Referring now to FIG. 3, a side view of a portion of axle housing 22 is presented, and, referring also to FIG. 4, various components contained by axle housing 22 are presented in a sectional view taken along line 4-4 in FIG. 3. As can be seen in FIG. 4, axle 18 may be rotatably supported by inboard bearing 28 and outboard bearing 30. (As used herein, "inboard" or "inward" will refer to a feature that is closer to the longitudinal centerline of vehicle 10 and "outboard" or "outward" will refer to a feature that is closer to wheel hub 26.) Inboard bearing cavity 32 may surround bearing 28, at least in part, and may be defined, at least in part, by cover 34. Seal 36 (e.g., a gasket) may be located between cover 34 and housing 22, in order to prevent the flow of oil in an inward direction out of inboard bearing cavity 32. Washer 104 may also ensure that oil is appropriately contained in cavity 32. Outboard bearing cavity 38 may surround bearing 30, at least in part, and may be defined, at least in, part by seal 40. Seal 40 (e.g., a metal face seal) may be located between outboard bearing cavity 38 and both of housing 22 and axle 18, in order to restrict the flow of oil out of outboard bearing cavity 38. In certain embodiments, outboard bearing cavity 38 may be further defined, at least in part, by internal flange 42 of housing 22. In certain embodiments, an additional seal 44 may be located between internal flange 42 and axle 18 (as well as between various other components within housing 22).

Housing 22 may contain a portion of powered shaft 24, which may include pinion gear 46 at an outboard end. Pinion gear 46 may mesh with idler gear 48, idler gear 48 may mesh with bull gear 50, and bull gear 50 may be rotationally fixed (e.g., via a splined connection) to axle 18. Accordingly, rotational power may be transmitted from power source 12 and into housing 22, via powered shaft 24. Power may also then be transmitted from powered shaft 24 to offset axle 18 (e.g., via pinion gear 46, idler gear 48, and bull gear 50). In this way, for example, power may be transmitted from the power source 12 to hub 26, in order to drive track 20 and propel vehicle 10.

Figure 5:
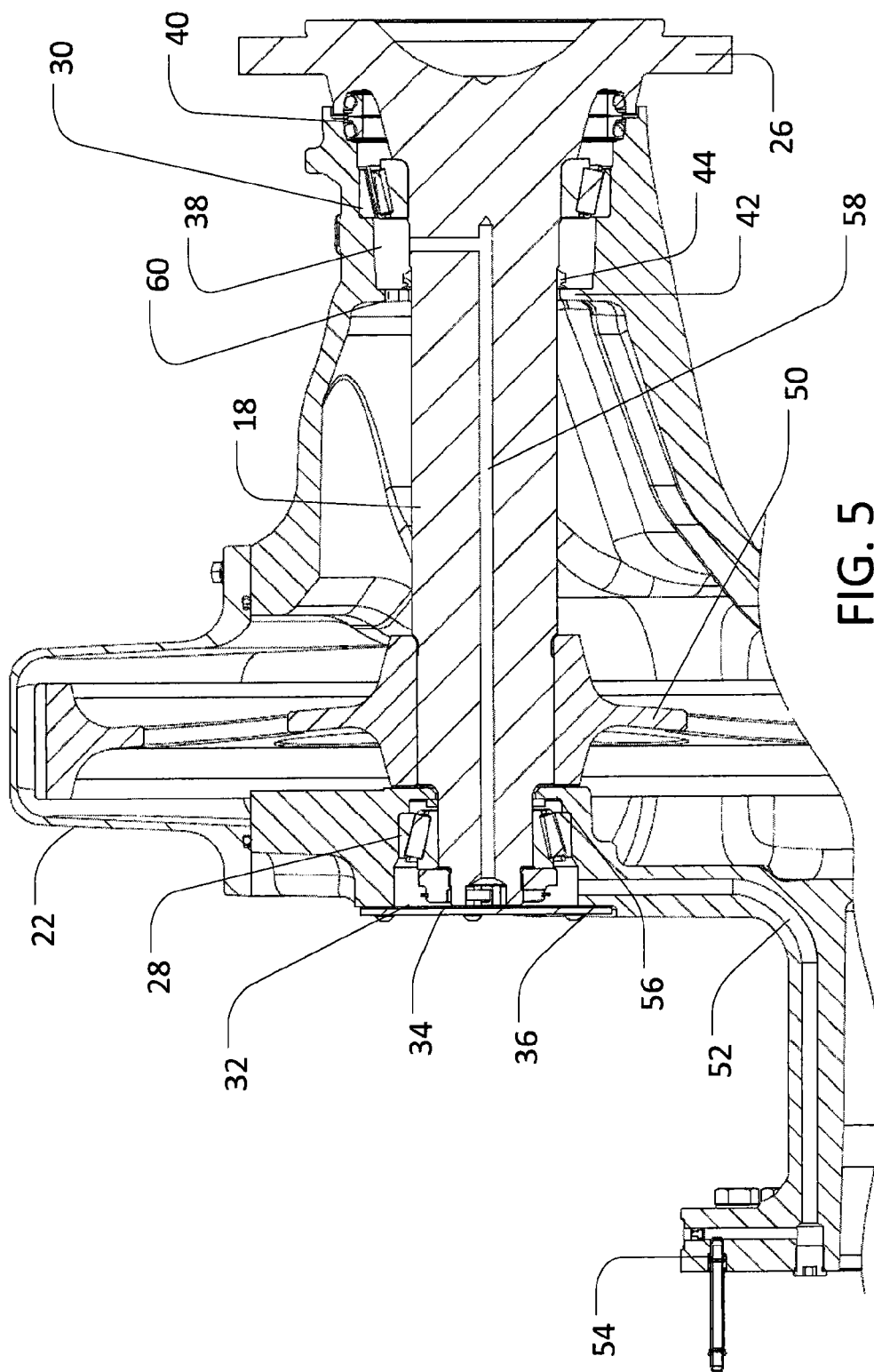
FIG. 5 is an enlarged sectional view of a portion of the lubrication apparatus taken along arc 5-5 of FIG. 4.

Referring also to FIG. 5, the portion of FIG. 4 indicated by arc 5-5 is presented in an enlarged view. In certain embodiments, the disclosed lubrication apparatus may provide a protected flow path for lubrication fluid, including for an offset shaft and offset gear box. For example, flow passage 52 may be contained within a wall of housing 22, extending from entrance port 54 to inboard bearing cavity 32. Oil (or other lubrication fluid) may be supplied to entrance port 54 (e.g., by an oil pump (not shown)). Oil may then flow through flow passage 52 to inboard bearing cavity 32, filling bearing cavity 32 to various levels. Within inboard bearing cavity 32, as contained by cover 34 and flange 56, oil may accordingly pass around and through bearing 28 thereby lubricating the bearing as well as various other components. Oil may then pass, driven by the pressurized flow through flow passage 52, into flow passage 58 within axle 18. Oil may flow through passage 58 to outboard bearing cavity 38, thereby filling bearing cavity 38 (to various levels). Within outboard bearing cavity 38, as contained by seal 40, seal 44, and flange 42, oil may accordingly pass around and through bearing 30 thereby lubricating the bearing as well as various other components.

In certain embodiments, one or more overflow ports (e.g., overflow port 60) may be provided in flange 42 (or another wall of bearing cavity 38). Overflow port 60 may be a bore through flange 42 at a particular location. In certain embodiments, for example, overflow port 60 may be located at a height representing between two-thirds and three-quarters of the total volume of bearing cavity 38, or at a height representing between two-thirds and three-quarters of the total height of bearing cavity 38. In certain embodiments, oil filling outboard bearing cavity 38 (as well as air enclosed by bearing cavity 38) may flow from bearing cavity 38 through overflow port 60 and back into the main portion of axle housing 22. In other embodiments, oil (and air) may flow from bearing cavity 38 through overflow port 60 to another location (e.g., a sump of a fluid pump that feeds oil to entrance port 54).

In certain embodiments, lubrication fluid may be retained within bearing cavities 32 and 38 even when an associated lubrication pump (or other fluid source) is not actively providing oil to housing 22. For example, if vehicle 10 ceases operation, the relevant pump may cease to provide oil to entrance port 54 and oil may, accordingly, cease to flow into both bearing cavities 32 and 38. Nevertheless, significant amounts of oil sufficient to lubricate bearing 30 may be retained (at least for a time) in bearing cavity 38 due, at least in part, to the flow barrier created by flange 42. Likewise, significant amounts of oil sufficient to lubricate bearing 28 may be retained (at least for a time) in bearing cavity 32 due, at least in part, to the flow barrier created by flange 56. This may be beneficial, for example, if vehicle 10 is to be towed in an unpowered state.

Flanges 42 and 56 may also act to counter some effects of vehicle tilt. For example, if housing 22 is on a down-slope side of vehicle 10, flange 42 and seal 44 may act to prevent excess oil from flooding into outboard bearing cavity 38 from the general cavity of housing 22. Also, if housing 22 is on an up-slope side of vehicle 10, flange 42 and seal 44 may act to prevent oil from excessively draining out of bearing cavity 38. Similarly, flange 56 and washer 104 may act to prevent excessive flooding or draining of inboard bearing cavity 32.

Figure 6:
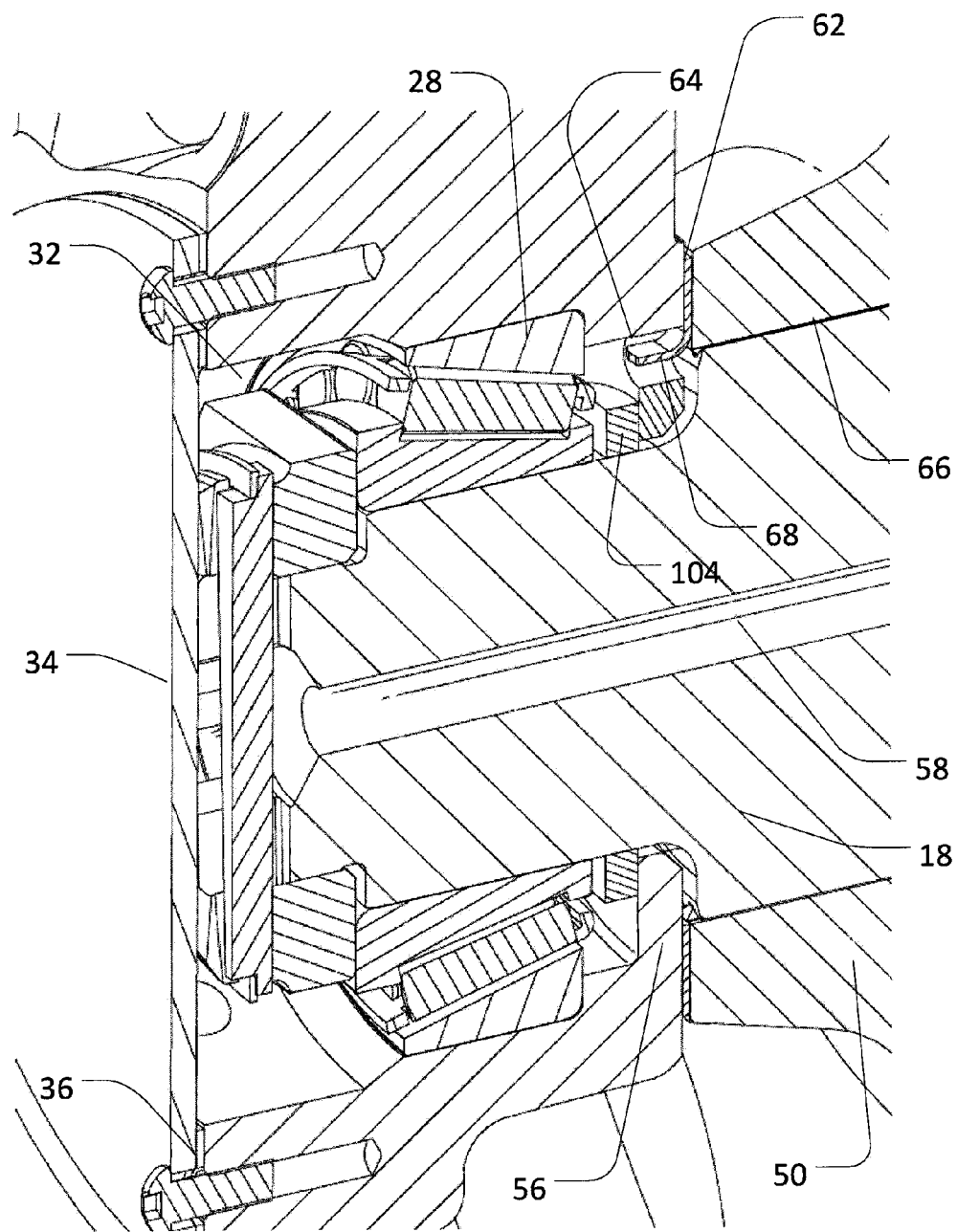
FIG. 6 is an enlarged perspective view of a portion of the lubrication apparatus components depicted in FIG. 5.

Referring also to FIG. 6, an enlarged view of inboard bearing cavity 32 and related components is presented. In certain embodiments, thrust bearing 62 may be located between gear 50 and flange 56. To facilitate lubrication of thrust bearing 62, lubrication port 64 may be provided through flange 56. In this way, for example, oil may flow from bearing cavity 32 through lubrication port 64 in order to lubricate various surfaces of thrust bearing 62. Further, oil flowing through lubrication port 64 may also lubricate various other components. For example, oil flowing through lubrication port 64 may also lubricate splined connection 66 between gear 50 and shaft 18. The location of lubrication port 64 in flange 56 may be selected, for example, based upon a desired maximum oil level in bearing cavity 32, a desired lubrication flow rate toward thrust bearing 62, or a variety of other factors.

Figure 7:
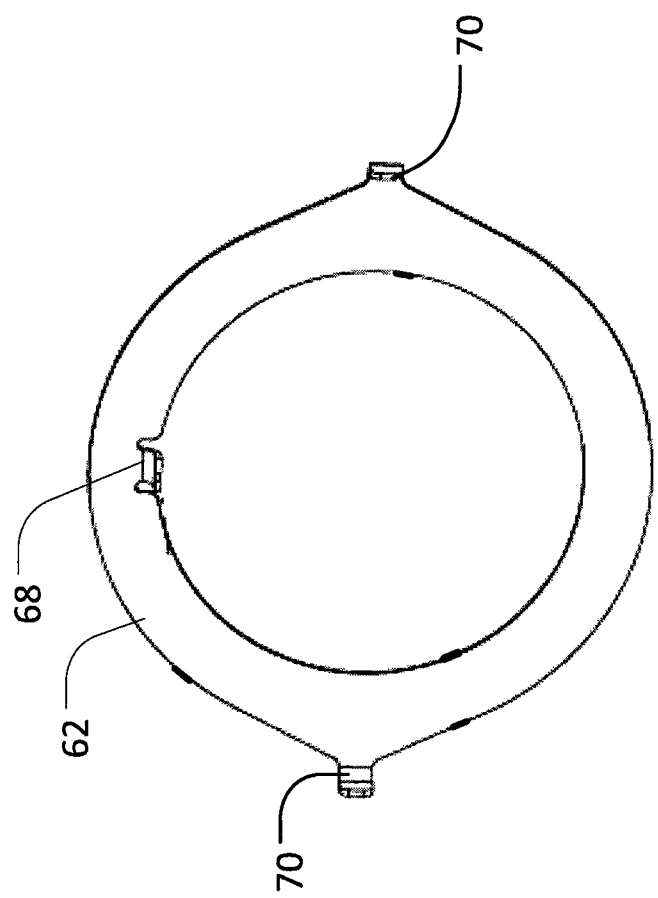
FIG. 7 is an end view of a thrust bearing component depicted in FIG. 6.

In certain embodiments, lubrication port 64 may additionally or alternatively provide an anti-rotating force to the thrust bearing. For example, one or more tabs (e.g., tab 68) may extend from thrust bearing 62 and may be seated in lubrication port 64 (or one or more similar additional ports (not shown)). As such, an anti-rotating force may be provided to thrust bearing 62 via contact between tab 68 and the interior walls of lubrication port 64. Further, to the extent that tab 68 does not entirely fill lubrication port 64, oil may still flow from bearing cavity 32 through lubrication port 64, in order to lubricate thrust bearing 62 and other components. Referring also to FIG. 7, an example configuration of thrust bearing 62 is depicted, with tab 68 at the top of the bearing and additional tabs 70 (e.g., for additional lubrication ports in flange 56) at either side of the bearing, which may also assist in positive location of washer 104 while preventing rotation of bearing 62.

Referring back to FIG. 4, other features of the disclosed apparatus may also assist in fluid management for axle housing 22 (or other power train assemblies). For example, as also described above, oil may drain out of outboard bearing cavity 38 via overflow port 60. Through gravitational action (as well as kinetic distribution by the rotation of axle 18), oil draining from port 60 may accumulate in sump 72. Annular flange 76 may extend around the interior of housing 22, providing a first dam height with respect to sump 72.

In certain embodiments, a fluid deflector (e.g., oil deflector 78) may extend from flange 76 into cavity 74 of housing 22. Such a fluid deflector may take a variety of configurations. For example, a fluid deflector surrounding a rotating shaft may be configured to effectively decrease the space around the rotating shaft through which lubrication fluid may flow out of cavity 74. In certain embodiments, a fluid deflector may be configured to effectively extend a fluid dam (e.g., that includes flange 76) farther outboard or inboard within housing 22.

Figure 8:
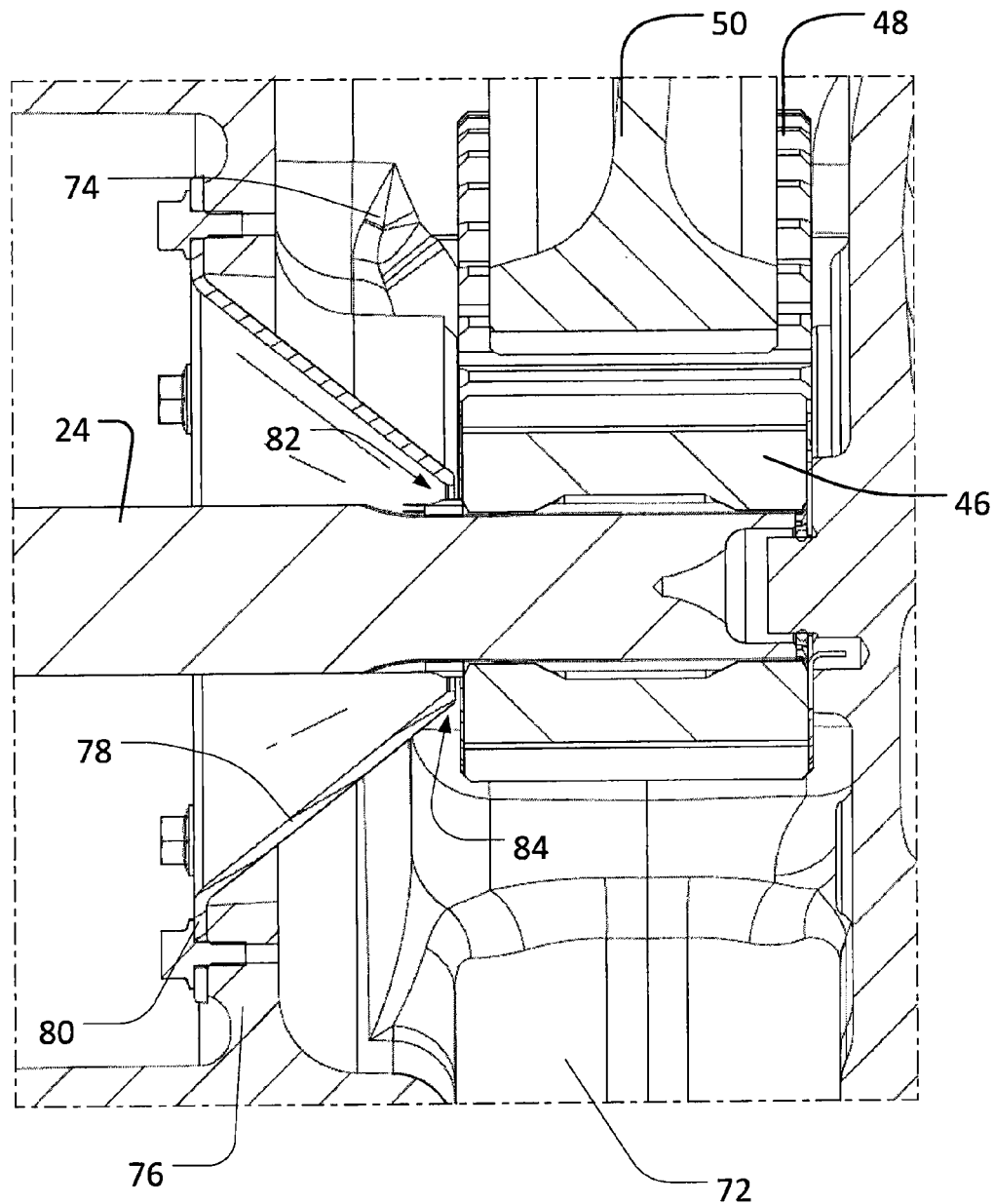
FIG. 8 is a sectional view of another portion of the lubrication apparatus taken along arc 8-8 of FIG. 4.

Referring also to FIG. 8, a enlarged view is presented of arc 8-8 of FIG. 4. As depicted in FIG. 8, an embodiment of a fluid deflector may include oil deflector 78. Generally, embodiments of oil deflector 78 may effectively extend the fluid barrier of flange 76 radially inward toward shaft 24 and outward toward pinion gear 46 (and sump 72). As depicted in FIG. 8, for example, oil deflector 78 may include a generally frustoconical profile and may be anchored to flange 76 of housing 22 by deflector flange 80. In certain embodiments, oil deflector 78 may be designed with a clearance 82 (e.g., annular gap 82) between its narrower end and drive shaft 24 (or may, for example, be designed with a seal between deflector 78 and drive shaft 24). Depending on its size, clearance 82 may, for example, restrict the flow of fluid out of (and into) cavity 74. In certain embodiments, oil deflector 78 may be designed with a small clearance 84 (e.g., annular gap 84) between its outboard end and pinion gear 46. This may, for example, both restrict the flow of fluid out of (and into) cavity 74 and also serve to hold pinion gear 46 in place (e.g., during an assembly process).

Figure 9:
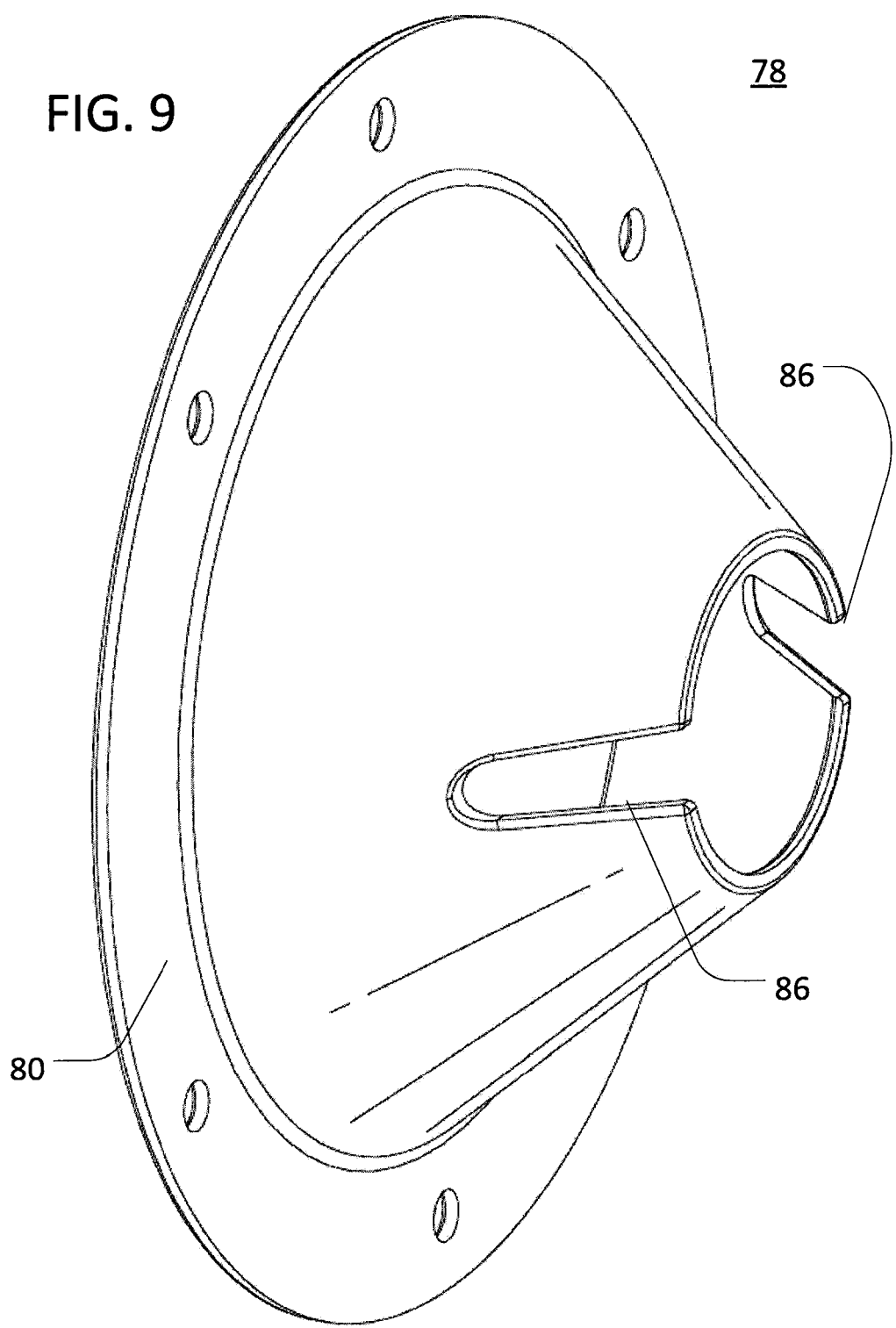
FIG. 9 is a perspective view of a deflector component of the lubrication apparatus depicted in FIG. 8.

In certain embodiments, a fluid deflector may include one or more openings having a variety of forms (e.g., openings, slots, holes, or tubes included on the deflector). Referring also to FIG. 9, oil deflector 78, for example, may include one or more openings configured as extended openings from an outboard end of the deflector. For example, openings 86 may extend in a rounded trapezoid configuration from the narrower (outboard) end of oil deflector 78 toward the wider (inboard) end of the deflector. Depending in part on the orientation and profile of openings 86, this may provide an effective (local) expansion of clearances 82 and 84, as well as a generally expanded drainage flow passage from (or into) cavity 74.

Among other benefits, oil deflector 78 may also serve to deepen sump 72 by the effective extension of flange 76 (e.g., into cavity 74). This may be generally beneficial for lubrication of gears 46, 48 and 50. It may also function usefully during tilted operation (or non-operation) of vehicle 10, which may cause lubrication fluid to flow toward and pool in down-slope portions of the lubrication system of the vehicle.

Figure 10:
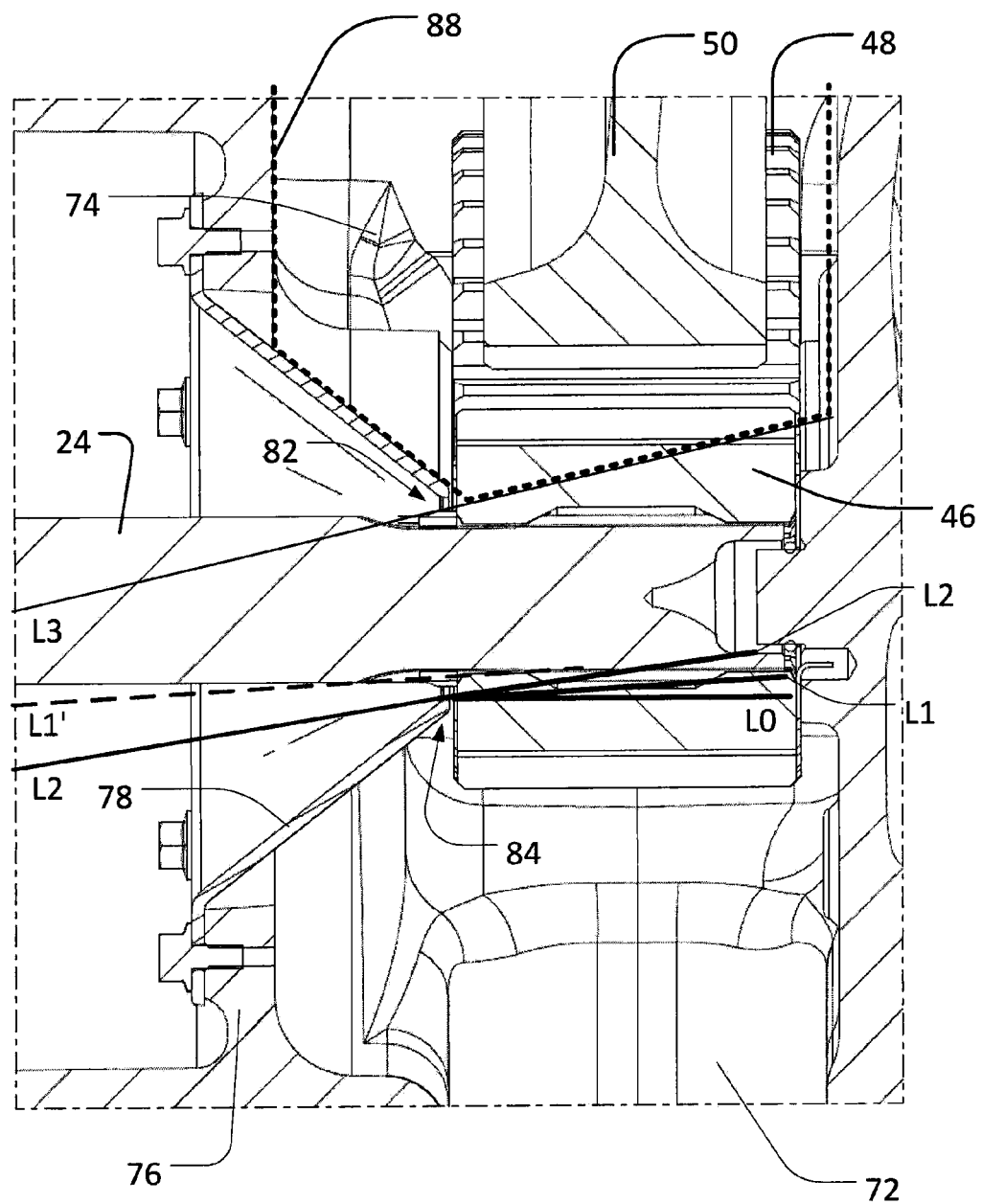
FIGS. 10 and 11 are sectional views similar to FIG. 8 showing fluid levels in a portion of the lubrication apparatus.

In certain instances, for example, vehicle 10 may tilt away from a normal level orientation, with housing 22 on the down-slope side of the vehicle. Various oil levels for such tilting, with respect to the view of FIG. 8, are represented in FIG. 10 by the levels L0, L1, L2, and L3. Level L0, for example, may represent a static oil level when vehicle 10 is at zero tilt (e.g., is evenly resting on level ground). Levels L1, L2, and L3, respectively, may represent static oil levels as vehicle 10 tilts with increasing deviation from normal (with housing 22 down-slope). Although L0 is presented at a particular level in this example, it will be understood that the disclosed system may be configured such that L0 reaches various other levels, including levels above or below flange 72 on one or both sides of deflector 78. It will further be understood that L0 may be at different levels, respectively, inboard and outboard of flange 76.

At zero tilt (i.e., level L0), deflector 78 may impede the flow of oil into or out of sump 72, thereby facilitating appropriate lubrication of gears 46, 48, and 50. At a tilt corresponding to level L1, deflector 78 may continue to impede the flow of oil that may otherwise begin to flow over flange 76 and into sump 72 (e.g., filling sump 72 to the dashed portion of the level L1 line). At a tilt corresponding to level L2, however, oil may flow past deflector 78 and into cavity 74 (e.g., through gaps 82 and 84).

As also discussed above, it will be noted that deflector 78 may effectively extend the location of gaps 82 and 84 into cavity 74. Accordingly, deflector 78 may also effectively lower the oil level in sump 72 at a vehicle tilt corresponding to fluid level L1, as compared to the oil level in sump 72 without deflector 78. For example, at a vehicle tilt corresponding to level L1 with deflector 78 as depicted in FIG. 10, if flange 76 (or deflector 78) instead extends directly to shaft 24 (but not into cavity 74), an oil level of L1' may result. It can be seen in FIG. 10 that level L1' rises above level L1, which may result in increased windage losses for gear 46 as well as unnecessary drainage of oil from other areas.

If vehicle 10 tilts at even greater deviations from normal, oil within housing 22 may rise to level L3. In certain configurations, air pocket 88 (indicated by dashed lines) may then be trapped within cavity 74 by oil deflector 78. This may serve, for example, to obstruct further flow of oil across flange 76 and into cavity 74.

Figure 11:
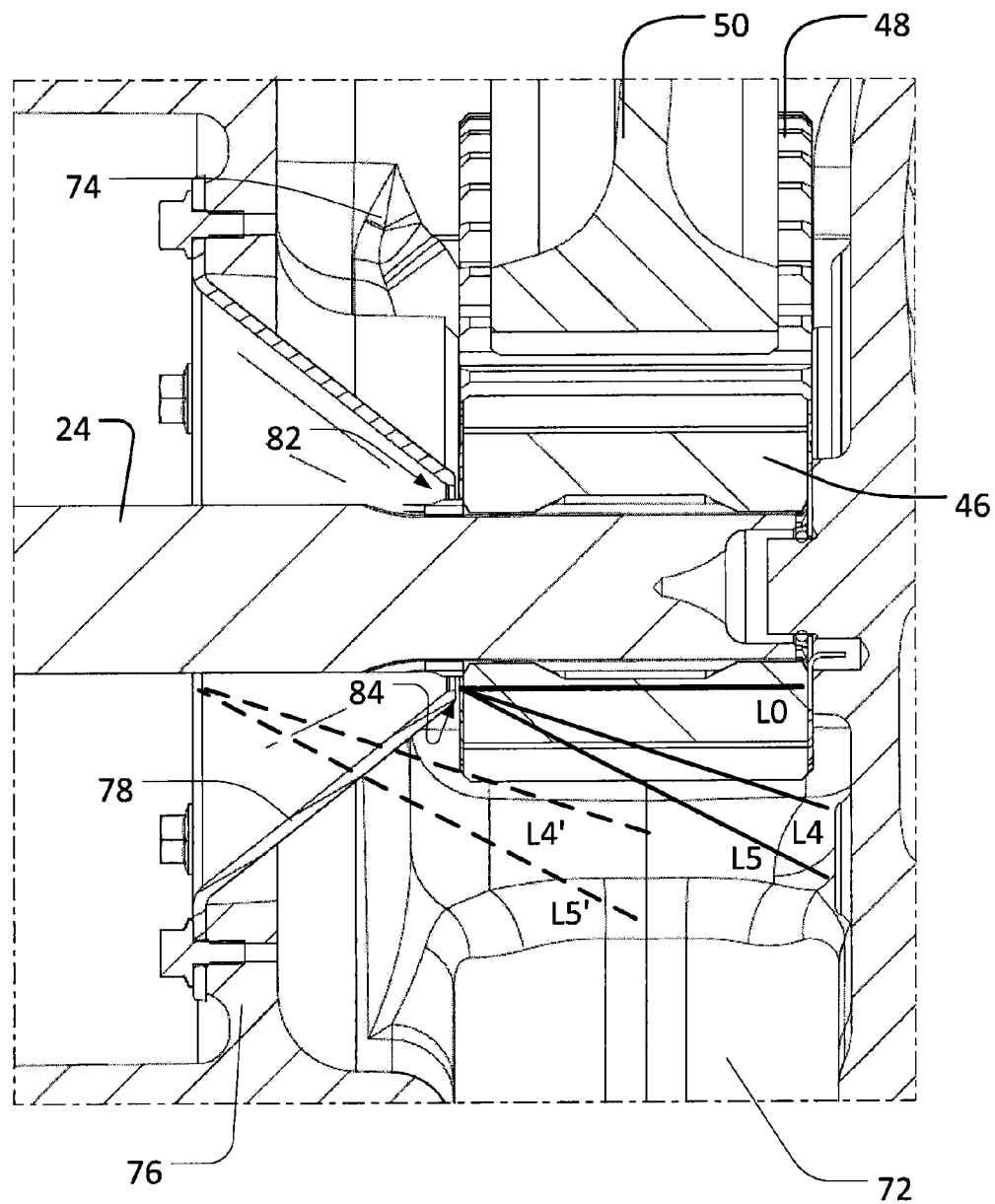

A fluid deflector (e.g., deflector 78) may also provide benefits when vehicle 10 is tilted with housing 22 on the up-slope side of the vehicle. Various oil levels for such tilting are represented in FIG. 11 by the levels L0, L4 and L5. Level L0 may again represent a static oil level when vehicle 10 is at zero tilt. (Again, it will be understood that in various embodiments L0 may be at various levels on one or both sides of deflector 78.) Levels L4 and L5, respectively, may represent static oil levels as vehicle 10 tilts with increasing deviation from normal (with housing 22 up-slope). In the depicted embodiment, at a tilt corresponding to both of levels L4 and L5, deflector 78 may impede the flow of oil that may otherwise drain over flange 76 and out of sump 72. In this way, for example, appropriate oil levels may be maintained within sump 72 even if housing 22 is tilted up-slope.

Further, as also noted above, deflector 78 may effectively extend the location of gaps 82 and 84 into cavity 74. Accordingly, deflector 78 may also effectively raise the oil level in sump 72 at a vehicle tilt corresponding to fluid levels L4 or L5, as compared to the oil levels in sump 74 without deflector 78 extending into cavity 74. For example, at a vehicle tilt corresponding to levels L4 and L5, respectively, with deflector 78 as depicted in FIG. 11, if flange 76 (or deflector 78) instead extends directly to shaft 24 (but not into cavity 74), oil levels L4' and L5' may result. It can be seen in FIG. 11, that levels L4' and L5' are below levels L4 and L5, respectively, which may result in insufficient oil in sump 72 for appropriate lubrication.

Figure 12:
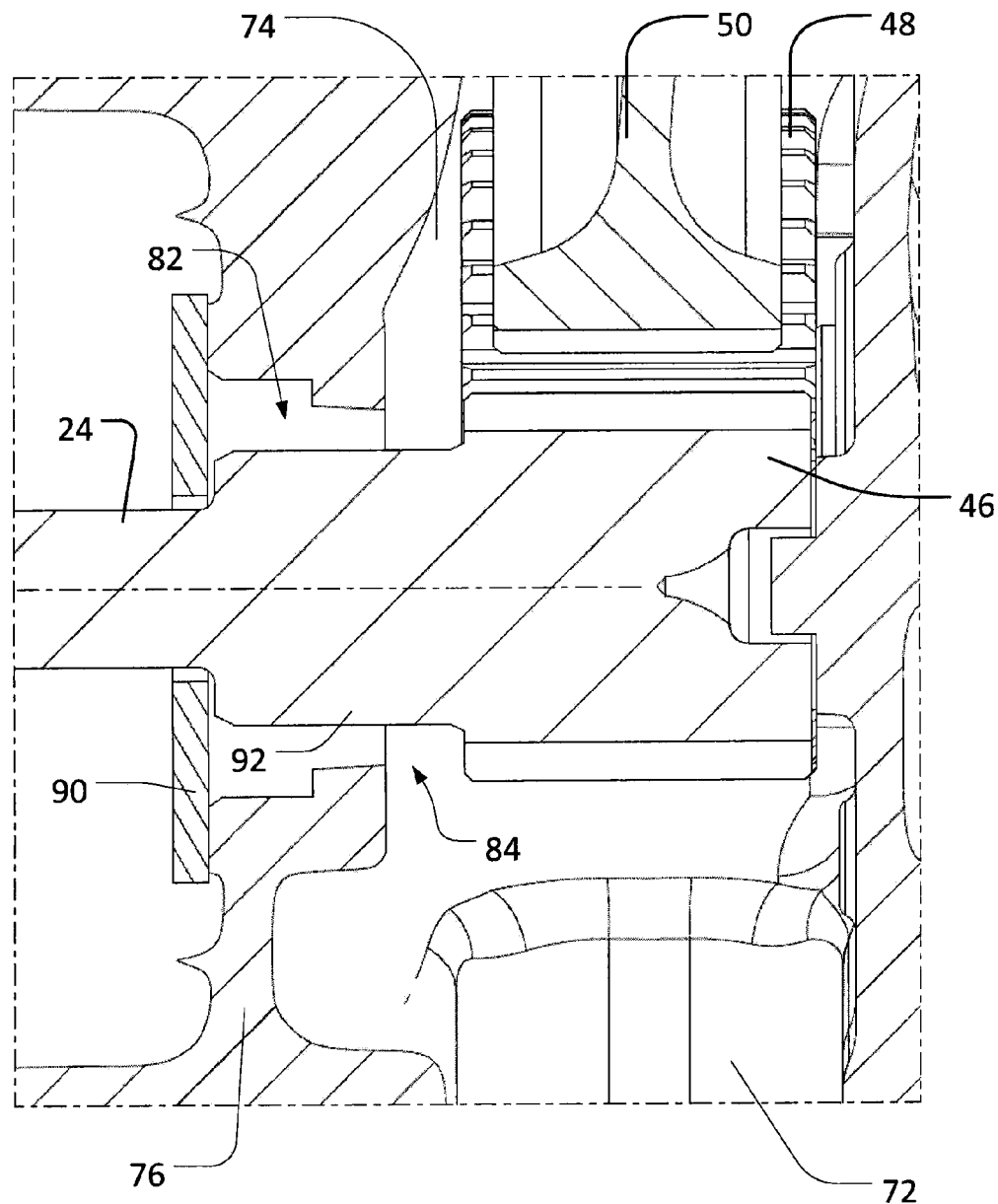
FIGS. 12-14 are sectional views similar to FIG. 8, depicting alternative configurations of components of the lubrication apparatus.
Figure 13:
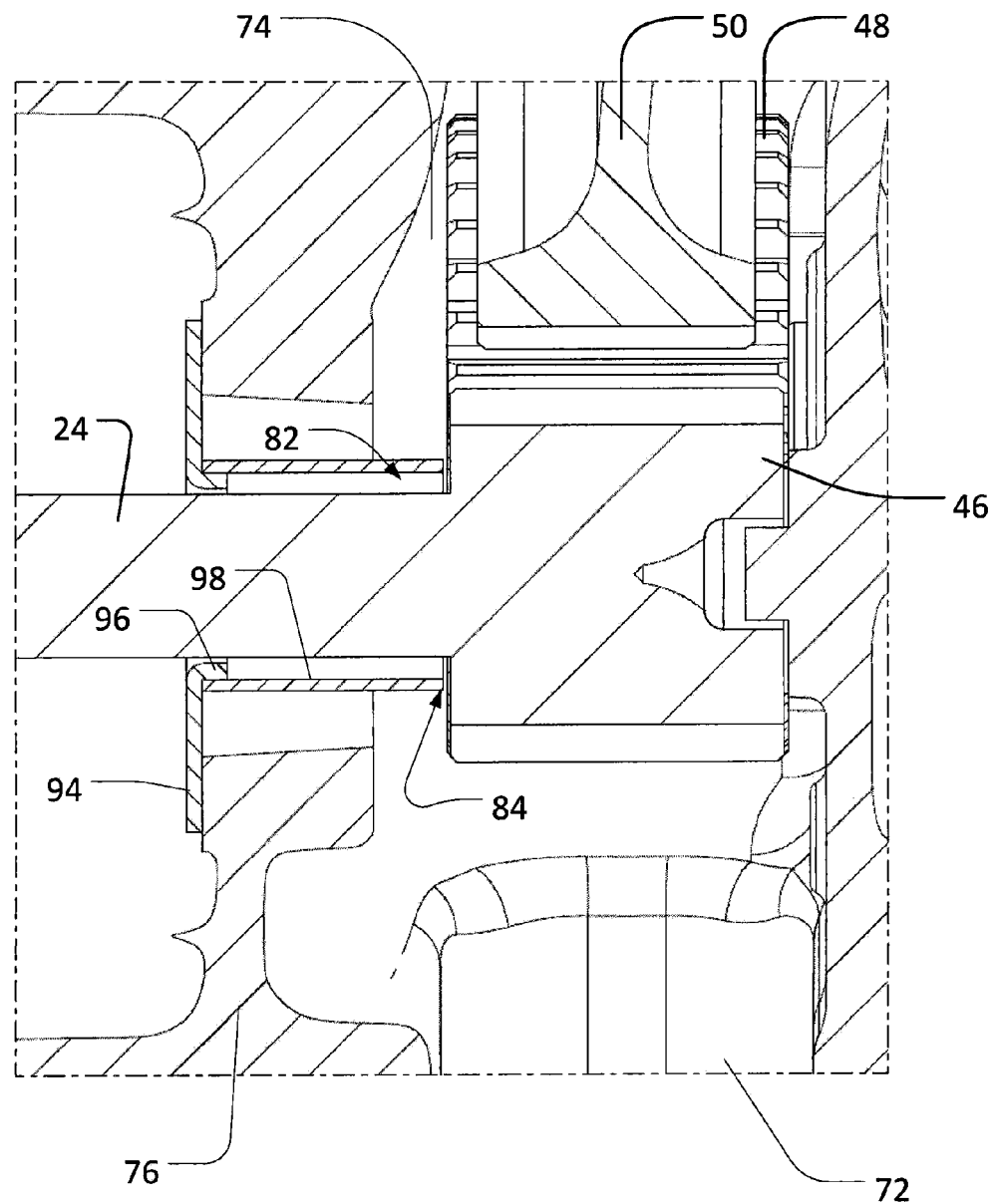
Figure 14:
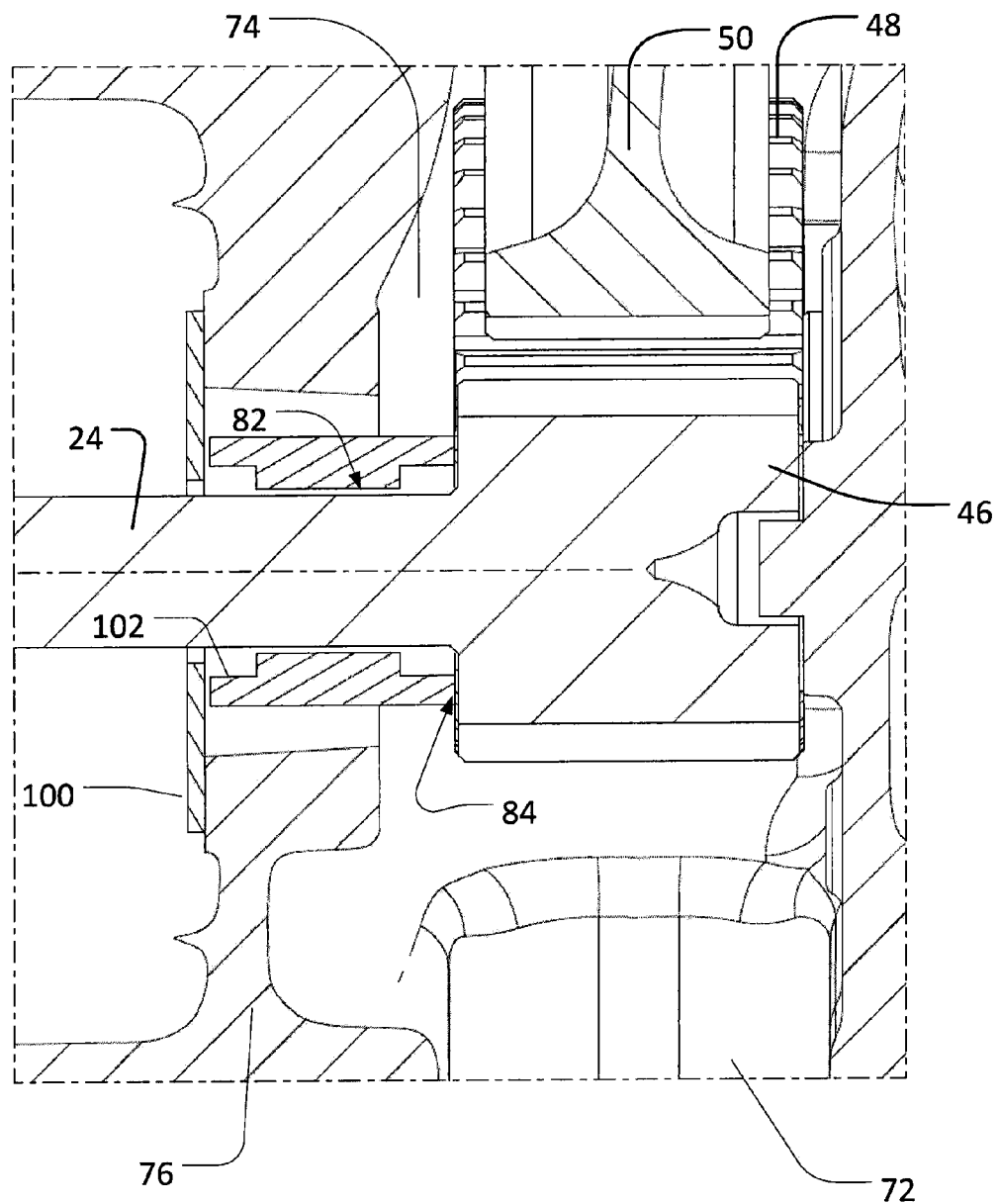

Various other configurations of a fluid deflector may be possible, including the various example depicted in FIGS. 12-14. In FIG. 12, for example, a deflector is depicted as being formed by barrier plate 90 and radial extension 92 of drive shaft 24. In FIG. 13, a deflector is depicted as being formed by barrier plate 94 (with outboard lip 96), and cylindrical sleeve 98. In FIG. 14, a deflector is depicted as being formed by barrier plate 100 and contoured cylindrical sleeve 102. It will be understood, for example, that the stepped inner profile of sleeve 102 in FIG. 14 is presented as an example profile and that other profiles (e.g., continuously varying profiles) may be possible. Further, it will be understood that the various features of the example deflectors of FIGS. 12-14 may be combined in various ways or replaced (in whole or in part) by various other features within the scope of this disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A lubrication apparatus for lubricating one or more power transfer components, the lubrication apparatus comprising:
   a first shaft enclosed, at least in part, by a housing having a first cavity;
   an inboard bearing rotatably supporting the first shaft;
   an inboard bearing cavity surrounding, at least in part, the inboard bearing;
   an outboard bearing rotatably supporting the first shaft;
   an outboard bearing cavity defined, at least in part, by a first internal flange of the housing, the outboard bearing cavity surrounding, at least in part, the outboard bearing;
   an entrance port to the housing, the entrance port being in fluid communication with a lubrication fluid flow source;
   a first flow passage, contained within a wall of the housing, and extending from the entrance port to the inboard bearing cavity;
   a second flow passage, contained within the first shaft, and extending from the inboard bearing cavity to the outboard bearing cavity; and
   an overflow port through the first internal flange of the housing, the overflow port extending between the outboard bearing cavity and the first cavity;
   wherein lubrication fluid from the lubrication fluid flow source flows into the entrance port and through the first flow passage, fills the inboard bearing cavity, flows through the second flow passage to the outboard bearing cavity, and drains from the outboard bearing cavity through the overflow port and into the first cavity.

2. The lubrication apparatus of claim 1, wherein the entrance port is radially offset from the first shaft.

3. The lubrication apparatus of claim 1, wherein the inboard bearing cavity is sealed, at least in part, by a cover and one or more seals, the cover and the one or more seals being located inward of the inboard bearing.

4. The lubrication apparatus of claim 1, wherein the outboard bearing cavity is sealed with one or more seals, the one or more seals being lubricated by the lubrication fluid in the outboard bearing cavity.

5. The lubrication apparatus of claim 1, further comprising:
a gear attached to the first shaft;
a thrust bearing separating the gear from a second internal flange of the housing, the second internal flange defining, at least in part, the inboard bearing cavity; and
a lubrication port in the second internal flange, the lubrication port extending between the inboard bearing cavity and a face of the thrust bearing;
wherein lubrication fluid passes from the inboard bearing cavity through the lubrication port to lubricate one or more of the gear and the thrust bearing.

6. The lubrication apparatus of claim 5, wherein the lubrication port provides an anti-rotating force to an extension of the thrust bearing.

7. The lubrication apparatus of claim 1, further comprising:
a second shaft extending into the first cavity of the housing through a third internal flange of the housing, the third internal flange separating, at least in part, the first cavity from a second cavity;
a first cavity sump within the first cavity, the first cavity sump containing lubrication fluid; and
a lubrication fluid deflector surrounding a portion of the second shaft and extending, at least in part, from the third internal flange into the first cavity.

8. The lubrication apparatus of claim 7, wherein the lubrication fluid deflector includes a frustoconical wall section having a primary axis, a first end, and a second end, the first end having a larger radius than the second end; and
wherein the second end of the wall section is contained by the first cavity and is located outboard of the first end of the wall section.

9. The lubrication apparatus of claim 8, wherein the wall section includes one or more openings extending along a portion of the wall section, the one or more openings permitting passage of lubrication fluid through the frustoconical wall section.

10. The lubrication apparatus of claim 9, wherein the one or more openings extend inward along the wall section from the second end of the wall section toward the first end of the wall section.

11. The lubrication apparatus of claim 7, further comprising:
a gear attached to the first shaft, the gear receiving rotational power from the second shaft;
wherein the second shaft is radially offset from the first shaft.

12. A lubrication apparatus for lubrication of one or more power transfer components, the lubrication apparatus comprising:
a first shaft extending through a first internal flange of a housing and into a first cavity within the housing;
a cavity sump within the first cavity, the cavity sump containing lubrication fluid;
a lubrication fluid deflector surrounding, at least in part, the first shaft, and extending, at least in part, into the first cavity;
a second shaft enclosed, at least in part, by the first cavity of the housing;
an inboard bearing rotatably supporting the second shaft;
an inboard bearing cavity surrounding, at least in part, the inboard bearing;
an outboard bearing rotatably supporting the second shaft;
an outboard bearing cavity defined, at least in part, by a second internal flange of the housing, the outboard bearing cavity surrounding, at least in part, the outboard bearing;
an entrance port to the housing, the entrance port being in fluid communication with a lubrication fluid flow source;
a first flow passage, contained within a wall of the housing, and extending from the entrance port to the inboard bearing cavity;
a second flow passage, contained within the second shaft, and extending from the inboard bearing cavity to the outboard bearing cavity; and
an overflow port through the second internal flange of the housing, the overflow port extending between the outboard bearing cavity and the first cavity;
wherein lubrication fluid from the lubrication fluid flow source flows into the entrance port and through the first flow passage, fills the inboard bearing cavity, flows through the second flow passage to the outboard bearing cavity, and drains, at least in part, from the outboard bearing cavity through the overflow port and into the cavity sump.

13. The lubrication apparatus of claim 12, wherein the lubrication fluid deflector includes a radial extension of the first shaft.

14. The lubrication apparatus of claim 12, wherein the lubrication fluid deflector extends from the first internal flange to a first radial distance away from the first shaft;
wherein at a point within the first cavity the lubrication fluid deflector extends to a second radial distance away from the first shaft; and
wherein the first radial distance is different from the second radial distance.

15. The lubrication apparatus of claim 14, wherein the lubrication fluid deflector includes a frustoconical wall section surrounding, at least in part, a portion of the first shaft, the frustoconical wall section having a primary axis, a first end with a first radius, and a second end with a second radius, the first radius being larger than the second radius; and
wherein the second end of the frustoconical wall section is contained within the first cavity.

16. The lubrication apparatus of claim 15, wherein the wall section includes one or more openings extending along a portion of the wall section, the one or more openings permitting passage of lubrication fluid through the wall section.

17. The lubrication apparatus of claim 16, wherein the one or more openings extend along the wall section from the second end of the wall section toward the first end of the wall section.

18. The lubrication apparatus of claim 12, further comprising:
a gear attached to the second shaft, the gear receiving rotational power from the first shaft;
a thrust bearing separating the gear from a third internal flange of the housing, the third internal flange defining, at least in part, the inboard bearing cavity; and
a lubrication port in the third internal flange, the lubrication port extending between the inboard bearing cavity and a face of the thrust bearing;
wherein lubrication fluid passes from the inboard bearing cavity through the lubrication port to lubricate one or more of the gear and the thrust bearing.

19. The lubrication apparatus of claim 12, wherein the second shaft receives rotational power from the first shaft; and
wherein the first shaft is radially offset from the second shaft.

* * * * *